United States Patent
Symons

(10) Patent No.: US 6,488,761 B1
(45) Date of Patent: Dec. 3, 2002

(54) HYDRAULIC HARDENED FOAMED PRODUCT AND A METHOD OF PRODUCING THE SAME

(75) Inventor: Michael Windsor Symons, Pretoria (ZA)

(73) Assignee: Windsor Technologies Limited, Nassau (BS)

(*) Notice: Subject to any disclaimer, the term of this patent is extended or adjusted under 35 U.S.C. 154(b) by 0 days.

(21) Appl. No.: 09/555,273

(22) PCT Filed: Nov. 27, 1998

(86) PCT No.: PCT/GB98/03556

§ 371 (c)(1),
(2), (4) Date: May 26, 2000

(87) PCT Pub. No.: WO99/28266

PCT Pub. Date: Jun. 10, 1999

(30) Foreign Application Priority Data

Nov. 28, 1997 (ZA) .............................................. 97/10730

(51) Int. Cl.⁷ ........................ C04B 12/00; C04B 14/38; C04B 38/10; C04B 18/18
(52) U.S. Cl. ...................... 106/603; 106/674; 106/677; 106/697
(58) Field of Search .................. 106/603, 674, 106/677, 697

(56) References Cited

U.S. PATENT DOCUMENTS

| 3,719,513 A |   | 3/1973 | Bragg et al. |
| 4,021,259 A |   | 5/1977 | Komatsu et al. ............ 106/111 |
| 4,263,365 A |   | 4/1981 | Burgess et al. |
| 4,518,652 A |   | 5/1985 | Willoughby |
| 5,395,571 A | * | 3/1995 | Symons ........................ 264/42 |
| 5,520,779 A | * | 5/1996 | Bold ........................... 106/772 |
| 6,248,812 B1 | * | 6/2001 | Symons ......................... 524/2 |

FOREIGN PATENT DOCUMENTS

| DE |   2 426 277   |   | 12/1974 |
| EP |   0296233     | * | 12/1988 |
| EP |   0 531 050 A1 |  | 3/1993 |
| FR |   2 669 020   |   | 5/1992 |
| WO |   WO 88/05098 |   | 7/1988 |

* cited by examiner

*Primary Examiner*—Elizabeth D. Wood
(74) *Attorney, Agent, or Firm*—Pillsbury Winthrop LLP

(57) ABSTRACT

A method of making a composite product such as a building board, includes the steps of mixing together finely divided lignocellulosic fibres, a hydraulic binder, and water optionally containing a polyvinyl alcohol, to form a paste; introducing a foam generated from a polyvinyl alcohol into the paste and mixing to form a foamed product; forming the foamed product into a desired shape; and allowing the hydraulic binder to set to form the composite product.

14 Claims, 2 Drawing Sheets

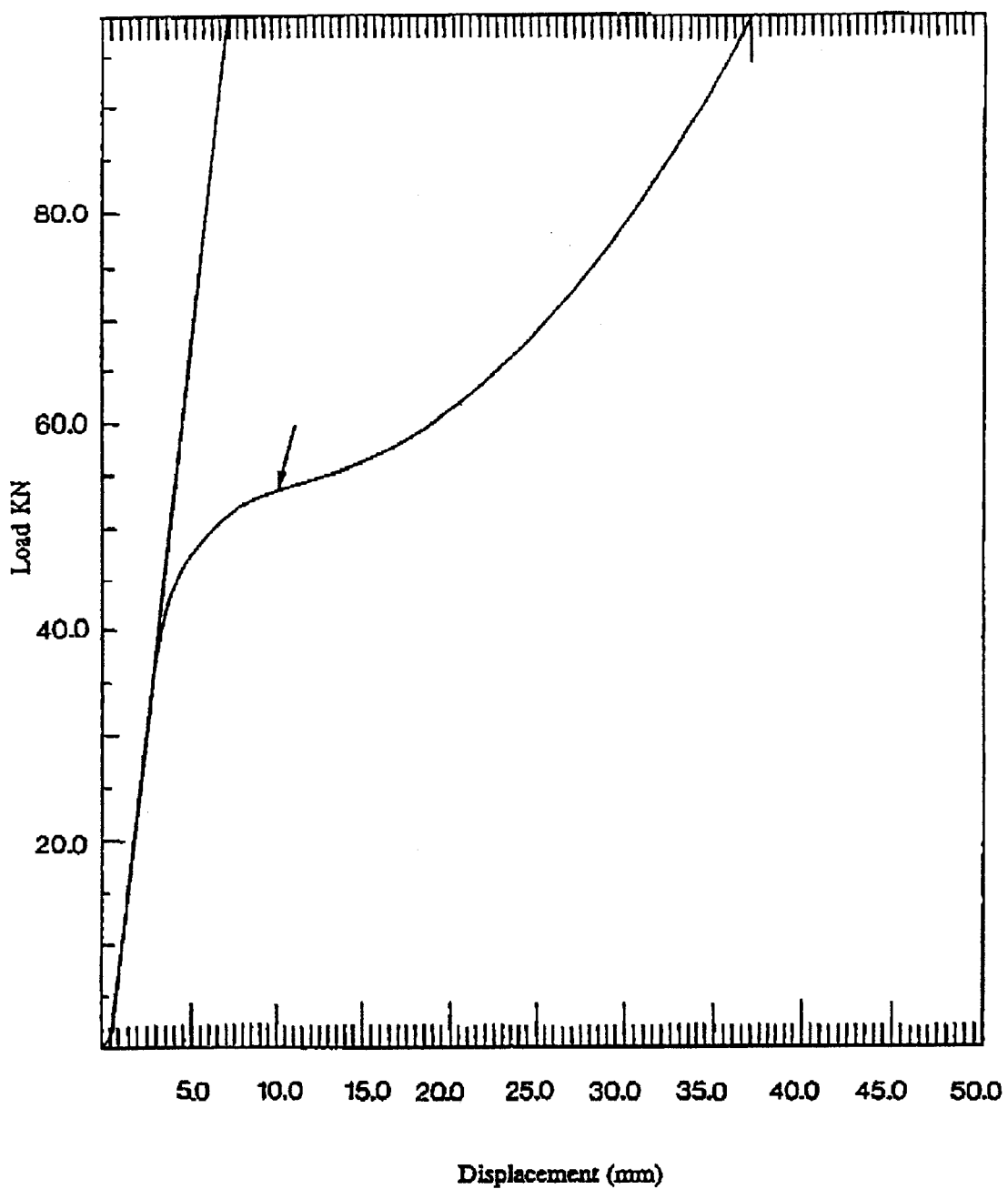

HYDRAULIC HARDENED FOAMED PRODUCT AND A METHOD OF PRODUCING THE SAME

This application is the national phase of international application PCT/GB98/03556 filed Nov. 27, 1998 which designated the U.S.

BACKGROUND OF THE INVENTION

This invention relates to a method of making a composite product from a finely divided lignocellulosic material and a suitable hydraulic binder, and to the composite product so made.

Cement bound wood wool and cement bound particle board are well known. Cellular or aerated cents are equally well known, the cells being formed either by foaming agents in water, the foam being added to a cement paste, or alternatively the cells being formed in the cement by an agent evolving gas in an alkaline medium.

An example of a foamed building board is disclosed in South African Patent No 92/6179 (corresponding to U.S. Pat. No. 5,395,571). This patent teaches a method of making a foamed building board or the like from the following components:

(a) a major amount of weight of an inorganic base material selected from the group consisting of a calcium sulphate hemihydrate, magnesium oxychoride, magnesium oxysulphace and a hydraulic cement;

(b) a suitable amount by weight of the inorganic base material of a thermosetting resin which is miscible, soluble or dispersable in water;

(c) a suitable amount of a catalyst for the thermosetting resin:

(d) water in an amount sufficient to rehydrate the inorganic base material with the water present in the other components;

(e) optionally a suitable amount of a plasticizer such as a melamine formaldehyde condensate;

(f) optionally a suitable amount of a polyvinyl alcohol;

(g) optionally a suitable amount of a retarder for the setting time of the inorganic base material;

(h) optionally a suitable amount of a fibrous reinforcing material; and (i) a suitable amount by weight of a foam or a foaming agent;

which method comprises the steps of:

(1) mixing together components (a), (b), (c) and (d), and (e), (f) and (g) if present;

(2) adding component (h) if present into the mixture of step (1);

(3) adding component (i) into the mixture of step (2) with stirring to give a foamed product;

(4) forming the product of step (3) into a building board; and (5) allowing rehydration of the inorganic base material to occur and curing of the thermosetting resin to occur.

Cement bound lignocellulosic composites can suffer from the disadvantage that the celluloses and the hemi celluloses in the lignocellulosic material are attacked by the alkaline components of the cement, and soluble sugars can retard Portland cement hydration. In addition, in foamed or cellular cement composites, cracking due to shrinkage and excessive brittleness can occur. A further disadvantage of cellular cement bound lignocellulosic composites is the cost of the foaming agent. Further, the extended setting time of, for example, a Portland cement can result in partial or total subsidence of the heavier fractions in the foamed mix resulting in variable cell size, or even major voids. Difficulty in process parameter controls can result in a product of variable density, consistency and performance.

There is a need for a new composite product containing a lignocellulosic material and a hydraulic binder.

SUMMARY OF THE INVENTION

According to a first aspect of the invention there is provided a method of making a composite product including the steps of:

(a) mixing:
  (i) a hydraulic binder,
  (ii) finely divided lignocellulosic fibres in an amount of from 1% to 30% inclusive by mass of the hydraulic binder; and
  (iii) water optionally containing a polyvinyl alcohol, the water being present in an amount sufficient to form a paste;

(b) introducing a foam generated from a polyvinyl alcohol into the paste, in an amount of from 0.5% to 15% inclusive by mass of the paste and mixing to form a foamed product;

(c) forming the foamed product into a desired shape; and (d) allowing the hydraulic binder to set to form the composite product.

It is to be noted that the composite product is formed in the absence of a thermosetting resin. In other words the composite product contains no thermosetting resin.

Lignocellulosic material refers to any plant material emanating from be photosynthetic phenomenon. This includes paper, linen, cotton, hessian, and the like.

By finely divided lignocellulosic fibres, there is meant unifibres, i.e since fibres, or bundles of a small number of unifibres of the lignocellulosic material. In other words, the lignocellulosic material is broken down into single or unifibres or bundles of a small number of fibres, rather than being in chip or particle form. This is necessary as the function of the finely divided lignocellulosic fibres is to act as a theological controller and foam stabiliser, and as a reinforcing fibre strengthened by the polyvinyl alcohol.

The finely divided lignocellulosic fibres are preferably obtained from paper mill sludge, paper waste or refined fibres such as are used in medium density fibreboard manufacture.

The hydraulic binder may be selected from the group consisting of a hydraulic cement, such as a Portland cement e.g ordinary Portland cement or Rapid Hardening Portland cement, a calcium sulphoaluminate cement, a high alumina cement, a gypsum cement, cacium sulphate hemihydrate in either the alpha or beta form, an alkali silicate, magnesiumn oxychloride, and magnesium oxysulphate, and mixtures of two or more thereof. The preferred hydraulic binder is gypsum, i.e calcium sulphate hemihydrate in either the alpha or beta form.

The finely divided lignocellulosic fibres are preferably used in an amount of from about 2.5% to about 15%, more preferably from about 3% to about 12% inclusive by mass of the hydraulic binder.

The finely divided lignocellulosic fibres and the hydraulic binder are mixed either with water or with a solution of water and a polyvinyl alcohol. In the latter case, the solution may contain about 1% to about 10% inclusive of the polyvinyl alcohol on the mass of the water.

The finely divided lignocellulosic fibres and the hydraulic binder must be mixed with sufficient of the water or the water/polyvinyl solution to form a paste.

In step (a) the finely divided lignocellulosic fibres may be dispersed in water or the solution of water and a polyvinyl alcohol, and thereafter the hydraulic binder in dry form may be added thereto and mixed to form the paste.

Alternatively in step (a) the finely divided lignocellulosic fibres in dry form may be mixed with the hydraulic binder in dry form, and thereafter water or the solution of water and a polyvinyl alcohol may be added thereto and mixed to form the paste.

The method of the invention may include a step, between step (a) and (b) of:

(e) immersing particles of a lignocellulosic material in water or in a solution of a polyvinyl alcohol in water, removing the surplus water or solution, and blending the particles with the paste of step (a).

By particles of a lignocellulosic material there is meant chips, strands or flakes of a lignocellulosic material, i.e particles which are much larger in size than the size of the finely divided lignocellulosic fibres, and which are intended as a filler material and not as a theological controller and foam stabiliser.

The solution of the polyvinyl alcohol in water preferably comprises an amount of from about 1% to about 10% of the polyvinyl alcohol by mass on the mass of the water.

In step (b), the foam is preferably generated by injecting air into a moving stream of a polyvinyl alcohol solution in water, the solution containing from about 1% to about 18% by mass inclusive of the polyvinyl alcohol, on the total mass of the solution, more preferably an amount of about 2% to about 7% by mass inclusive of the polyvinyl alcohol on the total mass of the solution.

A suitable surfactant may be added to the polyvinyl alcohol solution in order to lower surface tension and to propagate a fine cellular foam. Suitable surfactants include the silicone glycol copolymers such as DC193 or DC197 by Dow Corning The amount of foam added relative to the total mass of the paste, i.e the total mass of the lignocellulosic fibres and particles (if present), the hydraulic binder and water, is at a level of from 0.05% to 15% inclusive, preferably in an amount of from 1.5% to 8% inclusive by mass, more preferably in an amount of from 1.5% to 5% inclusive by mass.

In step (c), the foamed product may be cast or poured or otherwise dispensed into a suitable mould or casting receptacle or the like.

In step (d), the hydraulic binder is allowed to set, with or without acceleration promoted by heat induction or catalysis, to form the composite product.

Thereafter, the composite product may be used directly, or may be cut into smaller sections for use.

According to a second aspect of the invention there is provided a composite product made by the method set out above.

BRIEF DESCRIPTION OF THE DRAWINGS

FIG. 2 is a graph of a test of a composite product of the invention, depicting load on the X axis as against displacement on the Y axis.

DESCRIPTION OF EMBODIMENTS

Figure 1:
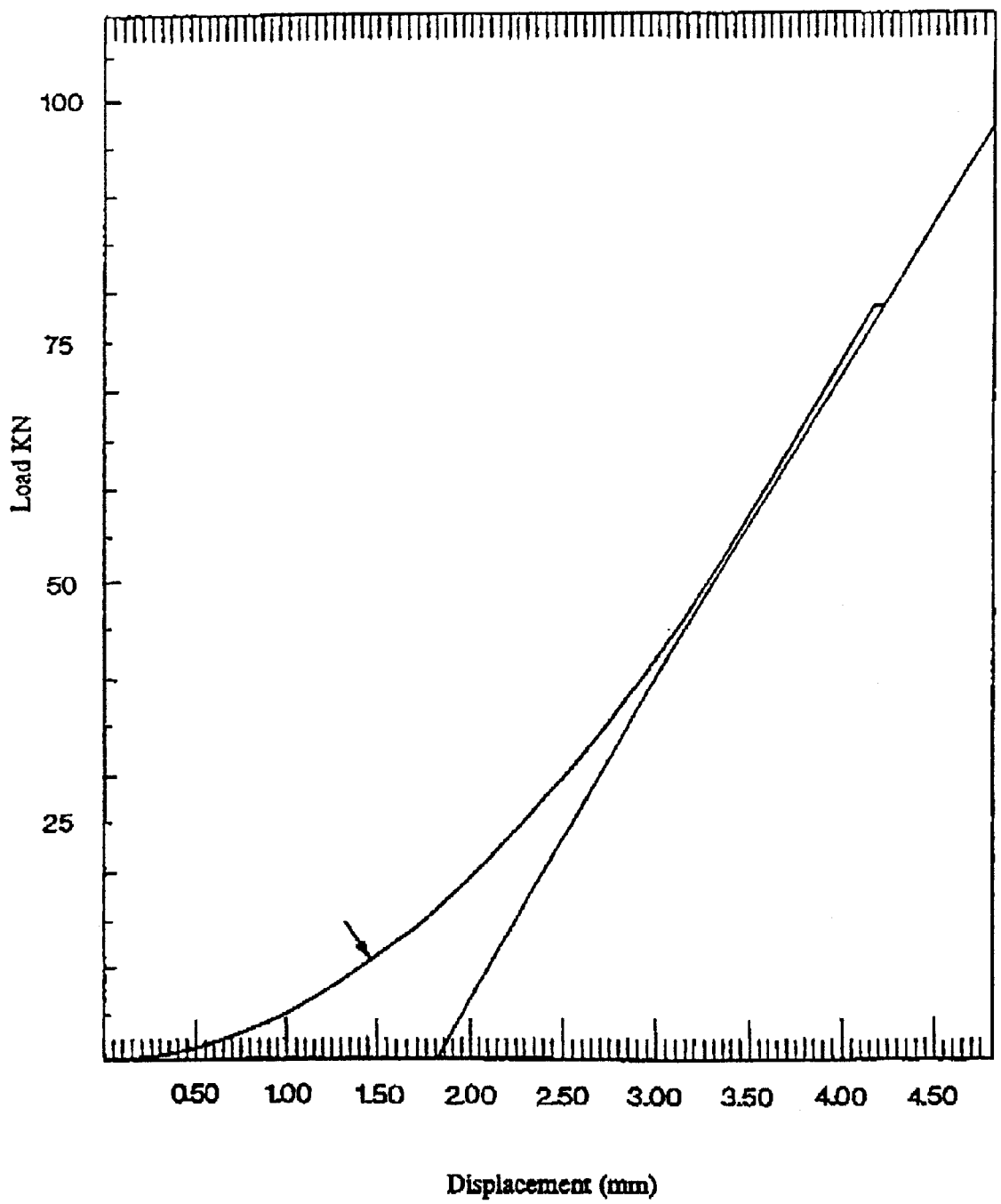
FIG. 1 is a graph from a test of a solid block of eucalyptus depicting load, applied at right angles to the direction of the grain on the X axis, as against displacement on the Y axis.

The invention relates to a method of making a composite product from finely divided lignocellulosic fibres, a hydraulic binder and water, optionally with a polyvinyl alcohol.

The finely divided lignocellulosic fibres may be obtained from any suitable source, and in particular may be obtained from paper mill sludge, waste paper or refined fibres such as are used in medium density fibreboard manufacture.

The makeup and method of preparation of a paper mill sludge for use in the method of the invention is set out below.

A typical paper mill sludge has a pH of the saturated paste of 8.13, a fibre percentage of 14.4, and results from X-ray emission scans as follows: Ca 18%; K 0.23%; Cl 0.2%; P 0.15%; S 0.12%; Si 4.4%; Al 3%; Mg0.8%; NaO,0.17%; C 68% and Fe 1.7% This analysis is based on qualitative X-ray emission scans. Hydrocarbon contents are determined by the burn off method. A typical sludge analysis is as follows:

| INORGANIC ANALYSIS | | |
|---|---|---|
| % LOI at 600° C. (indicative of total organics) | | 79.10 |
| % Ash at 900° C. | | 20.74 |
| | % Ash (m/m) | % Sample (m/m) |
| Calcium as CaO | 8.28 | 1.72 |
| Aluminum as $Al_2O_3$ | 13.57 | 2.81 |
| Magnesium as MgO | 0.41 | 0.09 |
| Iron as $Fe_2O_3$ | 0.43 | 0.09 |
| Phosphates as $PO_4^{2-}$ | ND | ND |
| Sulphates as $SO_4^{2-}$ | 24.00 | 4.98 |
| Acid insolubles | 52.02 | 10.65 |

ND = None detected.

Effluent emerging from a clarifier is typically a sludge of 2% solids in water. Having passed through a roller press, the sludge is at a 20% solids in water, following upon which it is typically passed through a screw press and a pelletising screen, whereupon the solids percentage rises from 30% to 60%.

The pellets of sludge are dried thoroughly to 0 to 15% water, preferably m the range of 0 to 3% water.

The form of milling is also an important prerequisite for sludge treatment. Milling is preferably done in an attritor mill or a plate mill or a stone mill, whereby two plates in close proximity to one another either, horizontal or vertical, move at disparate speeds one to the other, typically with one plate stationary although there may be contrary rotation or rotation at differential speeds to one another. Pelletised and dried sludge or paper waste is fed through the centre and is spun outward by centrifugal force and is rolled and the fibres separated without truncating their length. Clearance between the places is very small, right down to fibre diameter. All solid agglomerates are broken to finely divided dry powder. The milling may be referred to as the action of a stone mill, an attritor mill or a plate mill. After milling fines may be separated from the fibres by air separation if desired.

As an alternative, paper mill sludge exiting the paper mill, and without any pre-treatment as described above, but taking into account its water percentage which may be as high as 65% on a mass basis as it exits the paper mill, may be let down or slushed in water or a solution of water and polyvinyl alcohol, and then the hydraulic binder may be blended with the fibre-in-water suspension to form the paste.

In this case, the blending or mixing of the paper mill sludge with the hydraulic binder is of great importance, to ensure that the paper mill sludge does not form lumps or clumps, but rather disperses evenly throughout the hydraulic binder. Suitable mixers are pin or paddle type mixers or high speed dispersers.

Another material for use in the method of the invention is refined fibre such as is used in medium density fibreboard production—(MDF). MDF is produced from softwoods or hardwoods. Slab wood or round wood is converted into chips with a typical dimension of about 20 mm in a chipping machine. The chips are then screened to remove under sized materials, such as those below 5 mm, and over sized materials such as those over 40 mm. The sized chips are then treated to remove adhering dirt or grit and are steamed for several minutes under pressure at a temperature of about 160° C.

Thereafter the steamed chips are forced into the narrow gap between the rotating discs of a refiner. An example of such a refiner is a Sund defibrator. Individual fibre, fibres or fibre bundles are mechanically abraded from the surfaces of the steamed, softened chips. These then pass from the refiner to a drier. For example, in the drier, the wet fibres, including some residual steam, are combined with hot flue gases from a gas burner and the mixture then passed at high velocity along a flash drying tube. At the end of the tube, the dried fibres are separated from the steam and hot eases in a cyclone and are stored ready for use.

The finely divided lignocellulosic fibres are mixed with a hydraulic binder, as described below.

The hydraulic binder may be selected from the group consisting of a hydraulic cement, such as a Portland cement e.g ordinary Portland cement or Rapid Hardening Portland cement, a calcium sulphoaluminate cement, a high alumina cement, a gypsum cement, calcium sulphate hemihydrate in either the alpha or beta form, an alkali silicate, magnesium oxychloride, and magnesium oxysulphate, and mixtures of two or more thereof.

The preferred hydraulic binder is a Portland cement such as ordinary Portland cement or Rapid Hardening Portland cement, or a magnesium oxychloride, or more preferably gypsum, i.e calcium sulphate hemihydrate in either the alpha or beta form.

On the grounds of both cost and the fact that they are both waste products, the preferred constituents of the invention are gypsum in the form of calcium sulphate hemihydrate in either the alpha or beta form, paper mill sludge or common mixed paper waste, These combinations also have the added advantage of rapid setting and ease of subsequent drying.

In step (a) of the method of the invention, the finely divided lignocellulosic fibres are mixed with the hydraulic binder and with either water or a solution of water and a polyvinyl alcohol, to form a paste.

In step (a) the finely divided lignocellulosic fibres may be uniformly dispersed in water or the solution of water and a polyvinyl alcohol, and thereafter the hydraulic binder in dry form may be added thereto and mixed to form the paste.

Alternatively in step (a) the finely divided lignocellulosic fibres in dry form may be intimately mixed with the hydraulic binder in dry form, and thereafter water or the solution of water and a polyvinyl alcohol may be added thereto and mixed to form the paste.

The finely divided lignocellulosic fibres perform the very important function of rheological controller and foam stability agent. It is to be noted that other fibres such as synthetic fibres, e.g polyester fibres and inorganic fibres, generally have an insignificant influence on rheology and are not suitable for use in the method of the present invention.

An auxiliary pozzolanic binder of very fine particles size may be included in the paste produced in step (a). For example, undensified silica fume may be added to the paste premix in order to add to thixotrophy, to accelerate cement hydration, and to promote the stability of the foamed product as a function of particle size and particle surface area thus preventing collapse during cement hydration, and to contribute to the strength of the composite product.

For example, undensified or densified silica fume may be added to the combination of finely divided lignocellulosic fibres and hydraulic binder in an amount of from about 5% to about 17%, more preferably from about 10% a to about 15% by mass, on the mass of the hydraulic binder.

Silica fume has an average particle size of 0.15 micron and a surface area of about 20 000 $m^2$/kg. It is amorphous and consists of approximately 90% $SiO_2$.

The method of the invention includes an optional step, step (e). In terms of this step, particles of a lignocellulosic material, i.e larger chips, strands or flakes of a lignocellulosic material, are immersed in water or in a solution of a polyvinyl alcohol in water, Thereafter, the particles are removed from the water or solution and the surplus water or solution is allowed to drain. Then, the particles are blended with the paste of step (a).

The particles of lignocellulosic material may be for example chips from the breakdown saws of a saw mill or chips such as those used in particle board but ranging in size up to 25 mm in length, flakes, strands, wood wool and particles of appropriate agricultural fibres such as palm leaves, hemp, rice straw, wheat straw and the like.

The polyvinyl alcohol solution in which the particles are immersed, typically contains from 1% to 3% by mass of polyvinyl alcohol on the total mass of the solution.

The step of immersing the lignocellulosic particles in the solution of the polyvinyl alcohol in water results in the particles being strengthened and prevents water uptake by the particles from the paste itself.

These particles are used as a filler material and not as a rheological controller or foam stabiliser.

In step (b) of the method of the invention, a foam generated from a polyvinyl alcohol is introduced into the paste and mixed to form a foamed product. In this way, the cellular nature of the final composite product is achieved. This cellular structure controls the density of the composite product, imparts good acoustic or sound attenuation properties to the composite product, ensures that its mode of failure under compression, such as in a rock support, is correct, and favourably influences cost, handling and working properties. In particular, the polyvinyl alcohol foam in combination with finely divided lignocellulosic fibres improves mechanical properties.

Thus, in the case of cement, the mode of failure in compression, instead of being catastrophic as would be expected of a cementitious matrix, is such that as deformation continues, increasing compressive load may be carried. This is comparable to the mode of failure of a hard wood in rock support in deep level mining. In the case of gypsum, an open cell structure of low density and good cohesion is produced.

The polyvinyl alcohol utilised in step (a) or in step (e) is preferably a low viscosity partially hydrolysed polyvinyl alcohol such as Mowiol 4/88 by Clariant. This polyvinyl alcohol serves as a colloidal protector, stabilising the foam and as a polymer it reinforces the lignocellulosic fibres, to which it has a special affinity.

The polyvinyl alcohol used to form the foam is preferably a higher viscosity polyvinyl alcohol such as Mowiol 18/88 by Clariant. This polyvinyl alcohol propagates a dry stable foam compatible with hydraulic binders which also reinforces the resulting open cellular foam matrix.

Mowiol 4/88 and Mowiol 18/88 have a degree of hydrolysis of 87.7 mol % and an ester value in mg KOH per g of 140, and a residual acetal content of 10.7 weight percent.

As stated above, the polyvinyl alcohol solution from which the foam is formed preferably contains a surfactant. Suitable surfactants are the silicone glycol copolymers such as DC193 or DC197 by Dow Corning In step (c) of the method of the invention, the foamed product is cast or poured or otherwise dispensed into a suitable mould or casting receptacle.

In step (d) of the method of the invention, the hydraulic binder is allowed to set, with or without acceleration promoted by heat induction, or catalysis.

After a sufficient period of time allowing sufficient strength to be developed in the composite product, the product may be used directly or may be cut into sections for use.

An example of the method of the invention for the production of slabs of composite product for use as a rock, support in a mine will now be given.

EXAMPLE 1

Step 1

200 kg of wood chips with an average length of 25 mm are blended with 200 kg of wood chips with an average length of 10 mm and the mixture is submerged in a polyvinyl alcohol solution of 3% of Mowiol 4/88 in water on a mass basis. After a dwell time of one minute in the solution, the wood chips are removed and the excess solution is allowed to drain back into the tank.

Step 2

1 000 kg of ordinary Portland cement is blended with 100 kg of milled and cleaned paper mill sludge and 150 kg of undensified silica fume. 300 kg of water is added and the mixture mixed into a paste.

Step 3

The 400 kg of pre-weighted wood chips from Step 1 are now added and mixed.

Step 4

50 kg of a 3% polyvinyl alcohol solution of 18/88 Mowiol polyvinyl alcohol by Hoechst and 100 gms of DC193 surfactant by Dow Corning, all in water, is foamed in a foam generator and is added to the mix and folded in until a uniform cementitious foam is achieved.

Step 5

The mix is now dispensed into suitable moulds and the cement is allowed to set.

Step 6

Demoulding takes place and cure is allowed to go to completion.

Step 7

The resulting cellular cement bound lignocellulosic composite may either be used in the moulded form or it may be cut easily, e.g with a saw, ready for use.

The dry cured density of the resulting cementitious composite is controlled between 300 and 1000 kg/m$^3$ as a function of the amount of foam added. For rock support, the ideal density is between 650 and 1000 kg/m$^3$ which gives an initial deformation under a compressive load between 3.5 and 5 MPa, which is what is required for rock support, and the mode of failure thereafter is non catastrophic, Referring to the drawings, FIG. 1 is a graph from a test of a solid block of eucalyptus in which a load was applied to the block at right angles to the direction of grain. Load is depicted on the X axis as against displacement on the Y axis, so illustrating the mode of failure of the block.

FIG. 2 is a graph of the results of a test on a composite product of the invention, with a load being applied to the product. Again load is depicted on the X axis as against displacement on the Y axis, and may be compared to the graph of FIG. 1.

The composite product has a superior load support characteristic to the hard wood in that displacement only commences at a compressive load of approximately 5 MPa, which in any case can be varied as a function of density, and then continues to support increasing load with gradual displacement. The hard wood on the other hand shows displacement commencing immediately when subjected to load.

A further example of the invention win now be given.

EXAMPLE 2

Preparation of a Gypsum Foam Acoustic Product.

120 kg of common mixed paper waste in a slurry containing 65% by mass of water is slushed or dispersed in 1 700 kg of a 2% solution of Mowiol 4/88 in water, until the fibres are separate and intimately dispersed. 2 000 kg of calcium sulphate hemihydrate in the beta form is blended with the mix and into the resulting smooth paste is added 250 kg of a foam prepared from a 3% in water solution of Mowiol 18/88, the foam having been generated in an air injection foam generator, to produce a dry fluffy consistency. The foam is folded into the mix. The mix is then formed into stab form and the calcium sulphate hemihydrate is allowed to set. Setting occurs within 10 minutes and thereafter the formed slabs are dried to give a final density of 325 kg/m$^3$.

In order further to improve the material behaviour in fire, and to add cohesive strength, a 50% in water solution of sodium silicate Code 3379 by Silicate and Chemical Industries of South Africa, is applied to the outer surfaces of the slabs, and the slabs are re-dried, the density now having been increased to 375 kg/m$^3$.

What is claimed is:

1. A method of making a composite product which includes the steps of:
    (a) mixing:
        (i) a hydraulic binder comprising calcium sulphate hemihydrate in either the alpha or beta form;
        (ii) finely divided lignocellulosic fibres comprising paper mill sludge in amount of from 1% to 30% inclusive by mass of the hydraulic binder; and
        (iii) water in an amount sufficient to form a paste;
    (b) introducing a foam generated from a polyvinyl alcohol into the paste, in an amount of from 0.05% to 15% inclusive by mass of the paste and mixing to form a foamed product;
    (c) forming the foamed product into a desired shape; and
    (d) allowing the hydraulic binder to set to form the composite product, the composite product being formed in the absence of a thermosetting resin.

2. A method according to claim 1 wherein the finely divided lignocellulosic fibres are present in an amount of from 2.5% to 15% inclusive by mass of the hydraulic binder.

3. A method according to claim 1 wherein in step (a) the finely divided lignocellulosic fibres and the hydraulic binder are mixed with a solution of water and a polyvinyl alcohol, containing from 1% to 10% inclusive of the polyvinyl alcohol by mass of the water.

4. A method according to claim 1 wherein in step (a) the finely divided lignocellulosic fibres are dispersed in water or the solution of water and a polyvinyl alcohol, and thereafter the hydraulic binder in dry form is added thereto and mixed to form the paste.

5. A method according to claim 1 wherein in step (a) the finely divided lignocellulosic fibres in dry form are mixed with the hydraulic binder in dry form, and thereafter water or the solution of water and a polyvinyl alcohol is added thereto and mixed to form the paste.

6. A method according to claim 1 where in in step (b) the foam generated from a polyvinyl alcohol is introduced into the paste in an amount of from 1.5% to 8% inclusive by mass of the paste.

7. A method according to claim 1 wherein in step (b) the foam is generated by injecting air into a stream of a polyvinyl alcohol solution in water, the solution containing from 1% to 18% inclusive by mass of the polyvinyl alcohol on the total mass of the solution.

8. A composite product made by a method which includes the steps of:
   (a) mixing:
      (i) a hydraulic binder comprising calcium sulphate hemihydrate in either the alpha or beta form;
      (ii) finely divided lignocellulosic fibres comprising paper mill sludge in amount of from 1% to 30% inclusive by mass of the hydraulic binder; and
      (iii) water optionally containing a polyvinyl alcohol, the water being present in an amount sufficient to form a paste;
   (b) introducing a foam generated from a polyvinyl alcohol into the paste, in an amount of from 0.05% to 15% inclusive by mass of the paste and mixing to form a foamed product;
   (c) forming the foamed product into a desired shape; and
   (d) allowing the hydraulic binder to set to form the composite product, said composite product being formed in the absence of a thermosetting resin.

9. A composite product according to claim 8 wherein the finely divided lignocellulosic fibres are present in an amount of from 2.5% to 15% inclusive by mass of the hydraulic binder.

10. A composite product according to claim 8 wherein the finely divided lignocellulosic fibres and the hydraulic binder are mixed with a solution of water and a polyvinyl alcohol, containing from 1% to 10% inclusive of the polyvinyl alcohol by mass of the water.

11. A composite product according to claim 8 wherein in step (a) the finely divided lignocellulosic fibres are dispersed in water or the solution of water and a polyvinyl alcohol, and thereafter the hydraulic binder in dry form is added thereto and mixed to form the paste.

12. A composite according to claim 8 wherein in step (a) the finely divided lignocellulosic fibres in dry form are mixed with the hydraulic binder in dry form, and thereafter water or the solution of water and a polyvinyl alcohol is added thereto and mixed to form the paste.

13. A composite product according to claim 8 wherein in step (b) the foam generated from a polyvinyl alcohol is introduced into the paste in an amount of from 1.5% to 8% inclusive by mass of the paste.

14. A composite product according to claim 8 wherein in step (b) the foam is generated by injecting air into a stream of a polyvinyl alcohol solution in water, the solution containing from 1% to 17% inclusive by mass of the polyvinyl alcohol on the total mass of the solution.

* * * * *